United States Patent
Satoh

(10) Patent No.: US 11,919,415 B2
(45) Date of Patent: Mar. 5, 2024

(54) VEHICLE-MOUNTED CHARGING DEVICE AND VEHICLE-MOUNTED CHARGING DEVICE CONTROL METHOD

(71) Applicant: Panasonic Intellectual Property Management Co., Ltd., Osaka (JP)

(72) Inventor: Nobuaki Satoh, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 882 days.

(21) Appl. No.: 16/985,002

(22) Filed: Aug. 4, 2020

(65) Prior Publication Data

US 2020/0361333 A1   Nov. 19, 2020

Related U.S. Application Data

(63) Continuation of application No. PCT/JP2018/045287, filed on Dec. 10, 2018.

(30) Foreign Application Priority Data

Feb. 8, 2018  (JP) ................................. 2018-021282

(51) Int. Cl.
*H02J 7/00*  (2006.01)
*B60L 53/22*  (2019.01)
(Continued)

(52) U.S. Cl.
CPC ............... *B60L 53/62* (2019.02); *B60L 53/22* (2019.02); *B60L 58/12* (2019.02); *B60L 58/27* (2019.02);
(Continued)

(58) Field of Classification Search
CPC ................................ H02J 7/00; H02J 7/00714
See application file for complete search history.

(56) References Cited

U.S. PATENT DOCUMENTS

2014/0266038 A1   9/2014  Gibeau et al.
2016/0059732 A1*  3/2016  Loftus .................... B60L 58/27
                                                              903/907
(Continued)

FOREIGN PATENT DOCUMENTS

CN    106029432 A    10/2016
JP    2000-36328 A   2/2000
(Continued)

OTHER PUBLICATIONS

The International Search Report dated Feb. 26, 2019 for the corresponding International Application No. PCT/JP2018/045287, 6 pages.

(Continued)

*Primary Examiner* — Robert Grant
(74) *Attorney, Agent, or Firm* — Seed IP Law Group LLP

(57) ABSTRACT

Provided is a vehicle-mounted charging device in which a charging circuit subjects power supplied from an external power supply to power conversion and supplies power to a battery and a PTC heater in parallel. The vehicle-mounted charging device is provided with a control device which, when temperature adjustment of the battery by the PTC heater and charging of the battery are carried out at the same time, controls an output current of the charging circuit so as to approach a total value of an allowable value of charging current for the battery and a current consumption of the PTC heater at each time point during charging. The allowable value of charging current for the battery and the current consumption of the PTC heater are specified on the basis of battery characteristic information of the battery and heater characteristic information of the PTC heater which are stored in advance.

12 Claims, 7 Drawing Sheets

(51) Int. Cl.
  *B60L 53/62*    (2019.01)
  *B60L 58/12*    (2019.01)
  *B60L 58/27*    (2019.01)
  *H01M 10/44*    (2006.01)
  *H01M 10/48*    (2006.01)
  *H01M 10/615*   (2014.01)
  *H01M 10/625*   (2014.01)
  *H01M 10/633*   (2014.01)
  *H01M 10/637*   (2014.01)
  *H01M 10/6571*  (2014.01)
  *H02J 7/04*     (2006.01)

(52) U.S. Cl.
  CPC ....... *H01M 10/443* (2013.01); *H01M 10/486* (2013.01); *H01M 10/615* (2015.04); *H01M 10/625* (2015.04); *H01M 10/633* (2015.04); *H01M 10/637* (2015.04); *H01M 10/6571* (2015.04); *H02J 7/00714* (2020.01); *H02J 7/007194* (2020.01); *H02J 7/04* (2013.01); *B60L 2210/10* (2013.01); *B60L 2210/30* (2013.01); *B60L 2240/545* (2013.01); *B60L 2240/549* (2013.01); *H01M 2220/20* (2013.01)

(56) References Cited

U.S. PATENT DOCUMENTS

2016/0126760 A1    5/2016   Murata
2017/0057376 A1*   3/2017   Murata ................. B60L 53/14

FOREIGN PATENT DOCUMENTS

JP      2012-19678 A     1/2012
JP      2015-225782 A    12/2015
JP      2016-92953 A     5/2016

OTHER PUBLICATIONS

Japanese Notice of Reasons for Refusal, dated Sep. 30, 2021, for Japanese Application No. 2018-021282, 2 pages. (English Translation).

English Translation of Chinese Office action, dated Dec. 23, 2022, for Chinese Patent Application No. 201880088948.3. (12 pages).

* cited by examiner

VEHICLE-MOUNTED CHARGING DEVICE AND VEHICLE-MOUNTED CHARGING DEVICE CONTROL METHOD

TECHNICAL FIELD

The present disclosure relates to an in-vehicle charging device and a method of controlling the in-vehicle charging device.

BACKGROUND ART

Hybrid vehicles, electric vehicles or various other electric vehicles are equipped with a charging device that charges the battery, using power supplied from an external power source (e.g., a commercial power source).

It is known that this type of battery deteriorates the charging characteristics (e.g., cannot sufficiently store the supplied power, increases the power loss, or induces a partial overheat condition) in a low temperature environment (e.g., at a temperature of 0° C. or less).

Against this background, conventionally, the charging device of an electric vehicle controls, when charging the battery under a low temperature environment, supplying of power to the battery by supplying power to a battery temperature adjustment device (e.g., a resistive heater, or PTC heater or the like) as well, after raising the temperature of the battery or while raising the temperature of the battery (e.g., see PTL 1).

CITATION LIST

Patent Literature

PTL 1
Japanese Patent Application Laid-Open No. 2016-092953

SUMMARY OF INVENTION

Technical Problem

In this type of charging device, in order to shorten the charging time of the battery, there is a request to execute charging to the battery with a higher power while raising the temperature of the battery. Therefore, in such a charging device, execution of charging in a state where the current level of the power to be supplied to the battery is raised to the allowable limit of the battery, while supplying power to the battery temperature adjustment device, has been under study.

However, charging under such conditions possibly causes an overcurrent state to the battery due to load variations in the battery temperature adjustment device to which power is supplied in parallel with the battery. In particular, measures against overcurrent in this type of battery have difficulties in that the current level serving as the acceptable limit for the battery varies with the charging rate and temperature of the battery, and in that the power load of the battery temperature adjustment device varies, during execution of charging of the battery.

The overcurrent state in the battery causes deterioration of the charge and/or discharge characteristics of the battery and damage of the battery, such as, for example, generation of impurities by inducing an unintended chemical reaction in the battery, generation of ions which are not absorbed by the electrodes of the battery, or generation of variations in the cell voltages of the plurality of battery cells constituting the battery.

The present disclosure has been made in view of the above problems. An object of the present disclosure is to provide an in-vehicle charging device and a control method of the in-vehicle charging device each making it possible to execute charging of a battery with high power without generating the overcurrent state to the battery, even when the temperature adjustment of the battery by the battery temperature adjustment device and charging of the battery are simultaneously executed.

Solution to Problem

One aspect of the present disclosure is an in-vehicle charging device for converting, in a charging circuit, electric power supplied from an external power source, and supplying the electric power to a battery and a battery temperature adjustment device in parallel, the in-vehicle charging device comprising:

a control device for controlling an output current of the charging circuit such that the output current approaches a total value of an allowable value of a charging current of the battery and a current consumption of the battery temperature adjustment device at each time point during execution of charging, when temperature adjustment of the battery by the battery temperature adjustment device and charging of the battery are simultaneously executed, wherein the allowable value of the charging current of the battery and the current consumption of the battery temperature adjustment device are identified based on battery characteristic information of the battery and heater characteristic information of the battery temperature adjustment device, the battery characteristic information and the heater characteristic information being stored in advance.

Another aspect of the present disclosure is a control method of an in-vehicle charging device for converting, in a charging circuit, electric power supplied from an external power source, and supplying electric power to a battery and a battery temperature adjustment device in parallel, the method comprising:

controlling an output current of the charging circuit such that the output current approaches a total value of an allowable value of a charging current of the battery and a current consumption of the battery temperature adjustment device at each time point during execution of charging, when temperature adjustment of the battery by the battery temperature adjustment device and charging of the battery are simultaneously performed, wherein the allowable value of the charging current of the battery and the current consumption of the battery temperature adjustment device are identified based on battery characteristic information of the battery and heater characteristic information of the battery temperature adjustment device, the battery characteristic information and the heater characteristic information being stored in advance.

Advantageous Effects of Invention

According to the in-vehicle charging system according to the present disclosure, it is possible to execute charging of the battery at a high power without generating the overcurrent state to the battery, even when the temperature adjustment of the battery by the battery temperature adjustment device and charging the battery are simultaneously executed.

DESCRIPTION OF EMBODIMENTS

Figure 1:
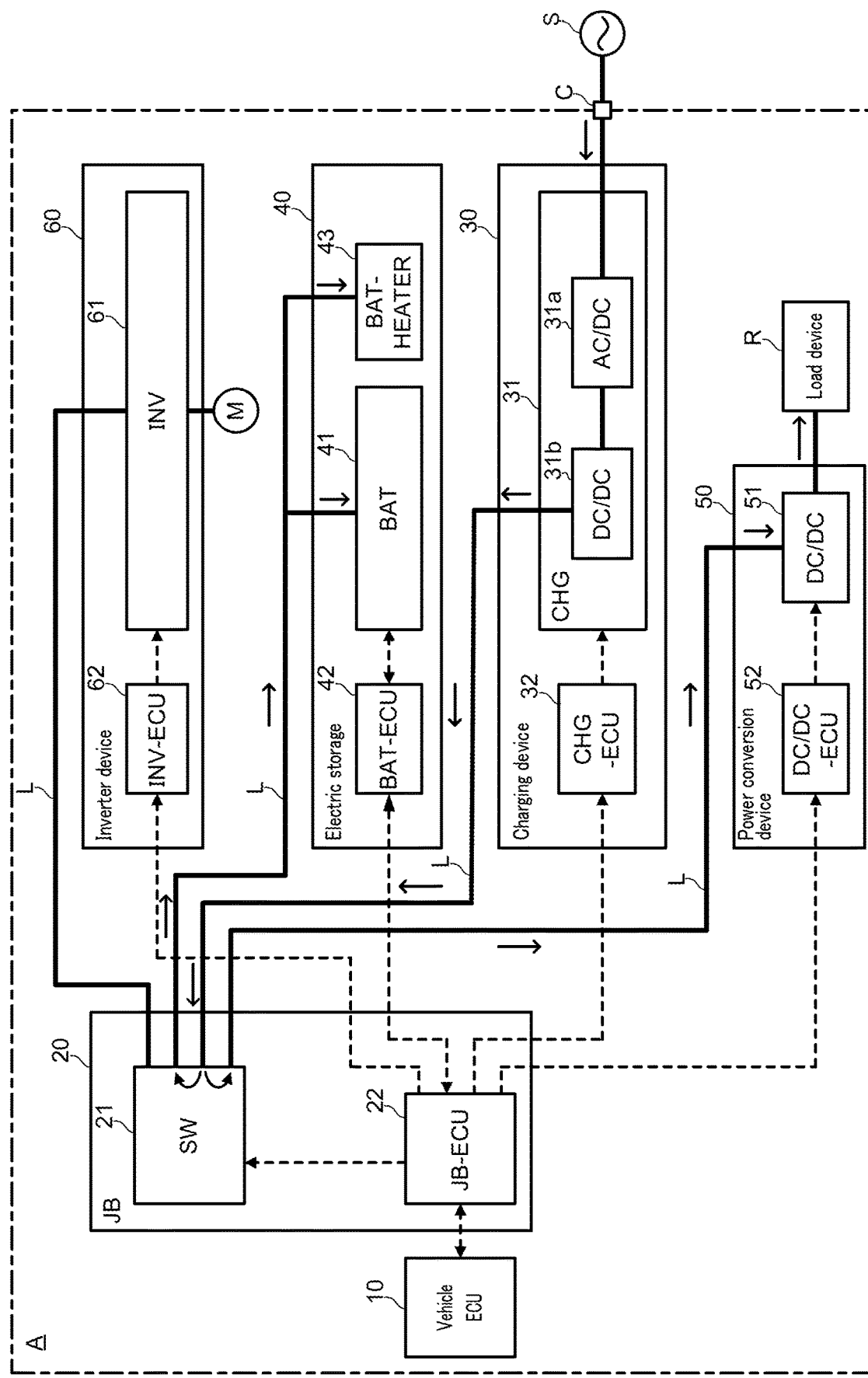
FIG. 1 is a diagram illustrating an example of a power system of a vehicle according to Embodiment 1.

Preferred embodiments of the present disclosure are described in detail with reference to the accompanying drawings, hereinafter. In the present specification and drawings, components having substantially the same functions are denoted by the same reference numerals, and a repetitive description thereof is omitted.

Embodiment 1

[Power System of Vehicle]

Hereinafter, as an example of a suitable application to which the in-vehicle charging system according to the present invention is applied, a mode in which the system is mounted on an electric vehicle is described.

First, with reference to FIG. 1, an example of an electric power system of a vehicle according to the present embodiment is described. Hereinafter, "electric power" is simply referred to as "power".

FIG. 1 is a diagram illustrating an example of an power system of vehicle A according to the present embodiment.

Vehicle A according to the present embodiment includes vehicle ECU 10, junction box 20, charging device 30, electric storage device 40, power conversion device 50, and inverter device 60.

In FIG. 1, dotted arrows represent the transmission and reception of signals between the respective parts. Thick line L represents the power line in vehicle A. Arrows on thick line L shows the path of the current flowing from charging device 30 toward battery 41 and the like upon charging.

Charging device 30 is a power module that converts power supplied from external power source S (e.g., converting the AC power into DC power) and supplies the power to battery 41 and the like. Charging device 30 includes charging circuit 31 (e.g., AC/DC converter 31a and DC/DC converter 31b), and electronic control unit 32 that controls charging circuit 31 (hereinafter, referred to as "charger ECU 32").

Electric storage device 40 is a power module that stores power serving as a driving source of vehicle A. Electric storage device 40 includes battery 41, PTC heaters 43, and electronic control unit 42 (hereinafter referred to as "battery ECU 42") that controls charge and/or discharge of battery 41 and/or monitors the status of battery 41.

Battery 41 is typically a lithium ion secondary battery, but may be any battery such as, for example, a nickel metal hydride secondary battery or an electric double layer capacitor. Alternatively, these battery cells may be connected in series or in parallel to constitute one battery.

PTC heater 43 is a battery temperature adjustment device that converts power supplied from charging circuit 31 or battery 41 into heat to heat battery 41. PTC heater 43 raises the temperature of battery 41 when causing battery 41 to charge and discharge at a low temperature. PTC heater 43 is disposed adjacent to battery 41 so that heat transfer to battery 41 is executed well. In the present embodiment, a mode in which PTC heater 43 is used as the battery temperature adjustment device is shown; however, the resistance type heater with which electrical resistance does not change depending on the temperature may be used as the battery temperature adjustment device.

Power conversion device 50 is a power module that converts the power supplied from electric storage device 40 or external power source S (e.g., converts the DC power of a high voltage into DC power of a low voltage) and supplies the power to load device R. Power conversion device 50 includes DC/DC converter 51, and electronic control unit 52 that controls DC/DC converter 51.

Load device R connected to power conversion device 50 is, for example, an electric component mounted on vehicle A (a headlight, a wiper or an audio device, and the like) or a low-voltage battery for driving the electric component, and the like. For example, power conversion device 50 receives power from charging circuit 31 to operate built-in DC/DC converter 51 so as to output power required by load device R connected to the subsequent stage (e.g., constant voltage output).

Inverter device 60 is a power module that converts the DC power received from the battery 41 and the like into AC power and supplies the AC power to a motor and/or the like. Inverter device 60 includes inverter circuit 61 and electronic control unit 62 that controls inverter circuit 61.

Junction box 20 connects power line L extended from each power module (here, charging device 30, electric storage device 40, power conversion device 50, and inverter device 60) with each other, and relay power transfer between each power module.

For example, junction box 20 includes electric path switching circuit 21 that switches the connection state between the electric power modules, and electronic control unit 22 (hereinafter referred to as "relay ECU 22") that controls the connection state of electric path switching circuit 21 or relays communication between each electric power module.

Vehicle ECU 10 is a vehicle control unit that controls the various parts of vehicle A in an overall manner. For example, vehicle ECU 10 outputs a command signal to relay ECU 22 to cause each power module to execute the desired operation via relay ECU 22.

In vehicle A according to the present embodiment, first, power from external power source S (e.g., a commercial AC power source of a single-phase AC) is supplied to charging device 30, as illustrated by the arrow on power line L in FIG. 1, via inputter C of vehicle A (e.g., a connection plug), when charging battery 41 is executed.

Power received by charging device 30 from external power source S is converted by charging circuit 31 (e.g., is converted from AC power to DC power) and is supplied to battery 41 via junction box 20.

When PTC heater 43 is operating, power received by charging device 30 from external power source S is supplied to PTC heater 43 in addition to battery 41 in parallel with battery 41.

Further, power received by charging device 30 from external power source S can also be supplied to load device R (e.g., when the charging rate of the low-voltage battery is reduced). In this case, power received by charging device 30 from external power source S is also supplied to load device R in parallel, in addition to the battery 41 and the PTC heater 43.

[Configuration of In-Vehicle Charging System]

Figure 2:
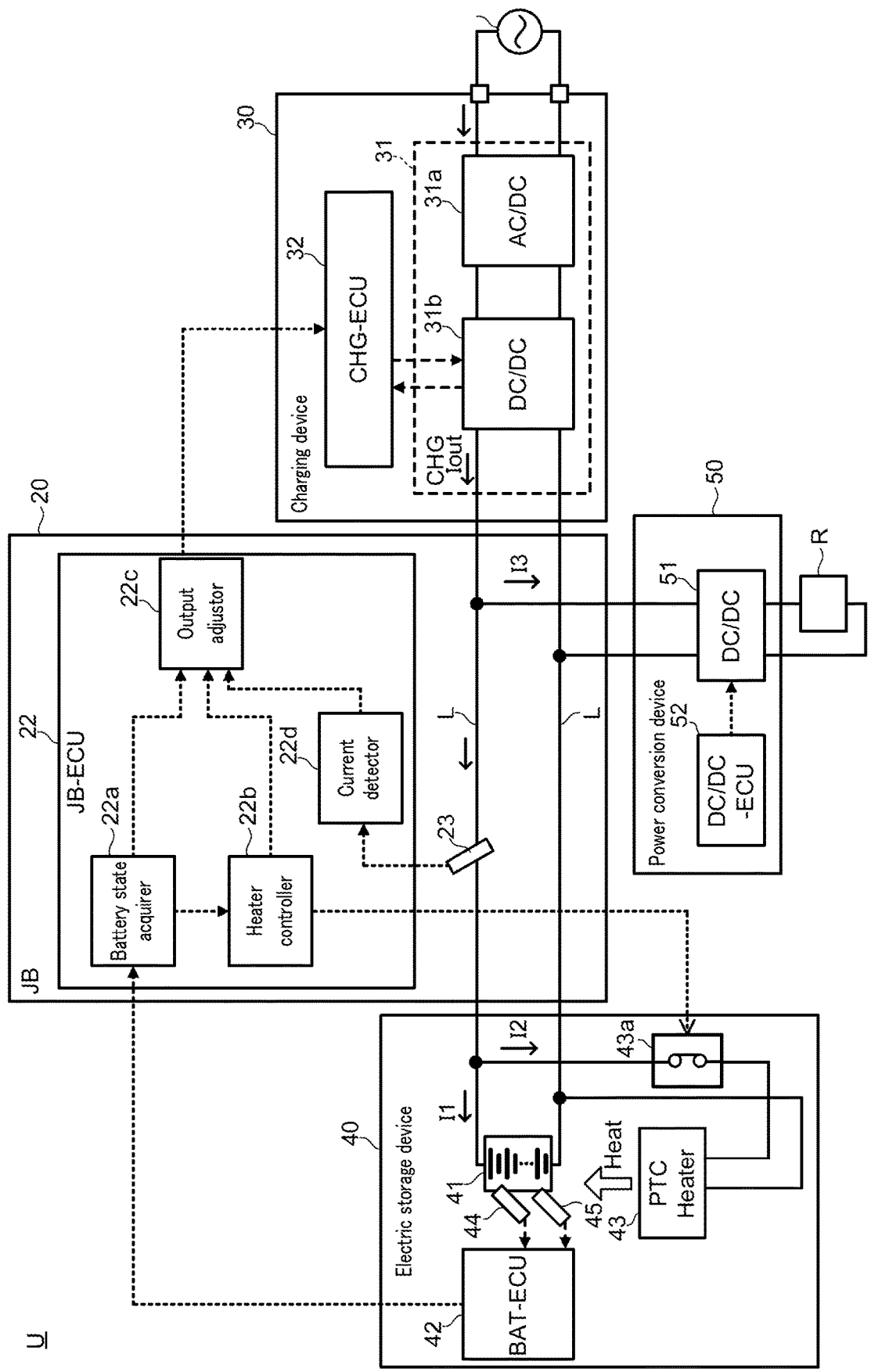
FIG. 2 is a diagram illustrating an example of the configuration of the in-vehicle charging system according to Embodiment 1.
Figure 3:
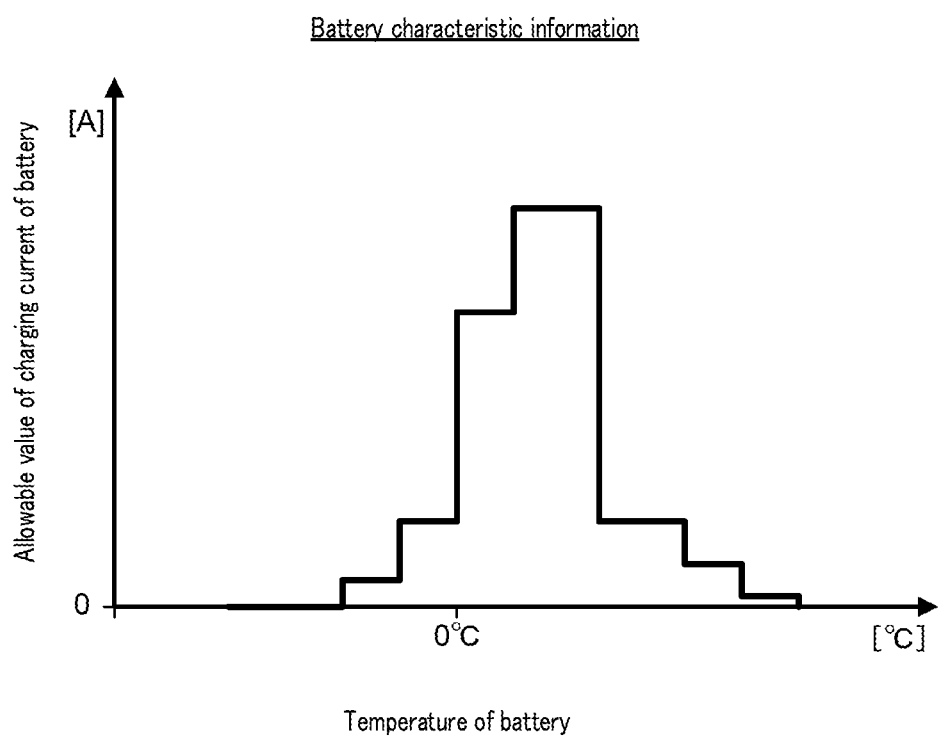
FIG. 3 is a diagram illustrating an example of battery characteristic information according to Embodiment 1.
Figure 4:
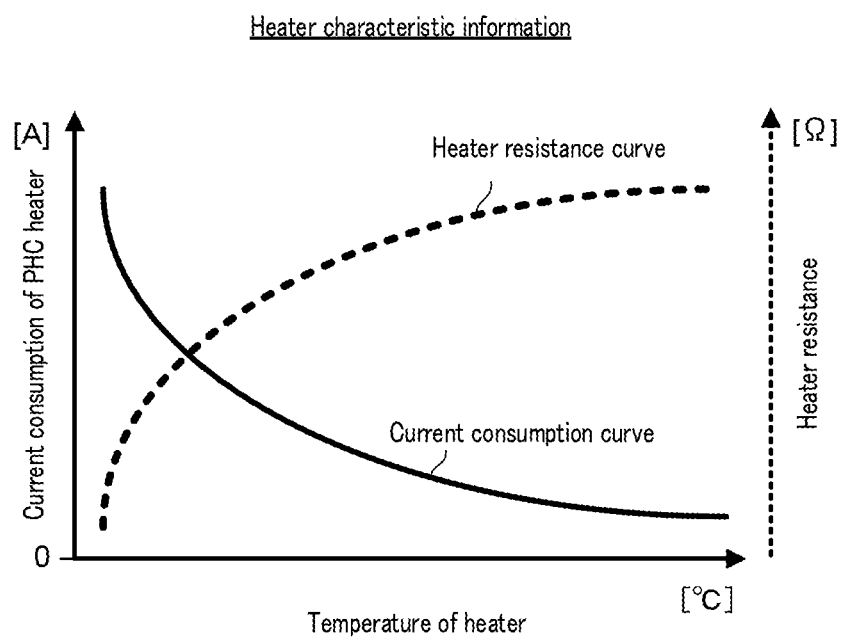
FIG. 4 is a diagram illustrating an example of the heater characteristic information according to Embodiment 1.

Next, with reference to FIGS. 2 to 4, in-vehicle charging system U for charging battery 41 in vehicle A is described.

FIG. 2 is a diagram illustrating an example of a configuration of in-vehicle charging system U according to the present embodiment.

In-vehicle charging system U according to the present embodiment is configured to include charging circuit 31 and charger ECU 32 (corresponding to the control device of the present invention) of charging device 30 (corresponding to the in-vehicle charging device of the present invention), battery ECU 42, and relay ECU 22. These configurations are mounted on vehicle A as illustrated in FIG. 1.

FIG. 2 shows a state that a commercial AC power source of the single-phase AC, as an external power source S, is connected to the input side of charging circuit 31 of charging device 30. Two power lines L in FIG. 2 are power lines of the high-side power line and the low-side side.

In-vehicle charging system U according to this embodiment controls the output power (in particular, the output current) of charging circuit 31 by cooperation of battery ECU 42, charger ECU 32, and relay ECU 22, and optimizes the level of the current (hereinafter, referred to as "charging current") to be supplied to battery 41.

When operating PTC heater 43, in-vehicle charging system U according to the present embodiment charges battery 41, while raising the temperature of battery 41 by PTC heater 43. At this time, power received by charging circuit 31 from external power source S is supplied in parallel to both battery 41 and PTC heater 43.

Therefore, when PTC heater 43 is operating, in-vehicle charging system U according to the present embodiment controls the output current from charging circuit 31 (Iout in FIG. 2), while considering both the current consumption of PTC heater 43 (I2 in FIG. 2) and the charging current to battery 41 (I1 in FIG. 2), (detailed later).

In in-vehicle charging system U according to the present embodiment, the operating state of PTC heater 43 is controlled by turning on/off switch 43a (e.g., relay) disposed in front of PTC heater 43, in which switch 43a is controlled by relay ECU 22.

When supplying power to load device R, in-vehicle charging system U according to the present embodiment supplies power in parallel to battery 41, PTC heater 43, and load device R. In this case, in-vehicle charging system U according to the present embodiment controls the output current from charging circuit 31 Gout in FIG. 2), while considering the current consumption of PTC heater 43 (I2 in FIG. 2), the charging current to battery 41 (I1 in FIG. 2), and the current consumption of load device R (detailed later).

As battery ECU 42, charger ECU 32, and relay ECU 22, for example, a microcomputer including a CPU (Central Processing Unit), a ROM (Read Only Memory), a RAM (Random Access Memory), an input port, an output port, and the like is used. Functions of battery ECU 42, charger ECU 32, and relay ECU 22 (detailed later) are realized by, for example, referring to control programs and various data stored in ROMs and RAMs. However, obviously, some or all of the functions of battery ECU 42, charger ECU 32, and relay ECU 22 may be implemented by dedicated hardware circuitry.

Battery ECU 42, charger ECU 32, and relay ECU 22 have a communication interface (e.g., a communication interface conforming to CAN (Controller Area Network) communication protocols) and are connected to each other so as to be able to communicate with each other.

<Charger ECU 32>

Charger ECU 32 is disposed in the housing of charging device 30 together with charging circuit 31, and is a control device that operates charging circuit 31.

Charging circuit 31 is a circuit that converts the power received from external power source S into a DC power of a predetermined current level and voltage level, and is configured to include, for example, AC/DC converter 31a and DC/DC converter 31b. AC/DC converter 31a is configured to include, for example, a rectifier circuit and a smoothing capacitor and/or the like, and converts the AC power received from external power source S into DC power to send the DC power to DC/DC converter 31b. DC/DC converter 31b is configured to include, for example, an LLC resonant converter circuit, converts the voltage of the DC power sent from AC/DC converter 31a, and outputs the DC power to battery 41 and PTC heater 43 connected in parallel to each other to the output side.

Charging circuit 31 (here, DC/DC converter 31b) is operated by, for example, a switching signal (e.g., PWM (Pulse Width Modulation) signal) outputted by charger ECU 32. The output current and the output voltage of charging circuit 31 is controlled by the switching signal from charger ECU 32.

Charger ECU 32 operates charging circuit 31 based on the target value of the output current or the target value of the output voltage set in its RAM and/or the like. Charger ECU 32 feedback-controls charging circuit 31 (DC/DC converter 31b) based on, for example, the sensor value of the current detecting circuit provided on the output side of charging circuit 31 (not illustrated) and the sensor value of the voltage detecting circuit (not illustrated) in order that the output current and the output voltage are each a target value.

Charging circuit 31 according to the present embodiment is operated and controlled by a constant current constant voltage charging (CCCV) system. Here, in particular, it is described that a constant current section that charges battery 41 at the charging current near the allowable limit of battery 41 (CC charging section of FIG. 6 to be described later).

"Target value of the output current of charging circuit 31" is preferably, as described above, a value that makes the actual value of the charging current to battery 41 (it means the actual value of the charging current, the same applies hereinafter) match the allowable value of the charging current of battery 41 (detailed later), from the viewpoint of shortening the charging time.

Note that, when PTC heater 43 is operating, the output current of charging circuit 31 is also used as a current consumption of PTC heater 43, in addition to the charging current to battery 41. The allowable value of the charging current of battery 41 varies depending on the state of battery 41 at each time when charging is executed (detailed later).

Therefore, the optimum value as the "target value of the output current of charging circuit 31" varies in time depending on the operating state of PTC heater 43 and the state of battery 41 and/or the like.

From this point of view, in in-vehicle charging system U according to the present embodiment, relay ECU 22 comprehensively monitors the state of battery 41 and the state of PTC heater 43, and determines the target value of the output current of charging circuit 31. Incidentally, the charger ECU 32, based on a command according to the target value of the output current of the charging circuit 31 from relay ECU22, and controls the operation of the charging circuit 31. Charger ECU 32 controls the operation of charging circuit 31, based on a command according to the target value of the output current of charging circuit 31 from relay ECU 22.

The target value of the output voltage of charging circuit 31, for example, is a voltage between the terminals of the battery 41 at each time when charging is executed, which is obtained from relay ECU 22. Note that when the reverse current and/or the like from battery 41 can be prevented, the target value of the output voltage may be configured not to be set.

<Battery ECU 42>

Battery ECU 42 is disposed in the housing of electric storage device 40 together with battery 41. Battery ECU 42 is an ECU that controls the operation of charging and/or discharging in battery 41 and/or monitors the state of battery 41 (e.g., the charging rate of battery 41 (State Of Charge), the temperature of battery 41, and the voltage between terminals of battery 41 and/or the like).

Battery ECU 42 acquires sensor signals from sensors incorporated in the battery 41 (in the present embodiment, current sensor 44 and temperature sensor 45), and monitors the state of battery 41 (in the present embodiment, the temperature of battery 41, the charging rate of battery 41, and the voltage between the terminals of battery 41) based on the sensor signal of the sensors. When charging of battery 41 is executed, battery ECU 42 determines the allowable value of the charging current corresponding to the state of battery 41.

Battery ECU 42 according to the present embodiment detects the temperature of battery 41 based on a sensor signal acquired from temperature sensor 45 (e.g., a thermistor or a thermocouple). The information of the temperature of battery 41 detected by battery ECU 42 is utilized, for example, as reference information at the time of temperature adjustment of battery 41, using PTC heater 43, and as reference information in determining the allowable value of the charging current of battery 41.

Temperature sensor 45 according to the present embodiment is used as a means for detecting the temperature of battery 41 and is also used as a means for estimating the temperature of PTC heater 43 (detailed later). Note that, in addition to temperature sensor 45, a sensor for directly measuring the temperature of PTC heater 43 may be provided.

Battery ECU 42 according to the present embodiment detects the current level of the charging current to battery 41 and the current level of the discharging current from battery 41 based on the sensor signal acquired from the current sensor 44 (e.g., a shunt resistor or a Hall element), and calculates the charging rate of battery 41 by the accumulation of these current levels and the charging time for battery 41, or the accumulation of the discharging time from battery 41. The information of the charging rate of battery 41 detected by battery ECU 42 is utilized, for example, as reference information when charging is stopped, and as reference information when the allowable value of the charging current of battery 41 is determined.

Note that the method by which battery ECU 42 detects the temperature and/or the charging rate of battery 41 is optional. Battery ECU 42, for example, may use other temperature sensors provided in the vehicle, in place of temperature sensor 45 built in battery 41. Battery ECU 42, may also detect the charging rate of battery 41, based on, for example, the voltage between the terminals of the positive and negative electrodes of battery 41.

Battery ECU 42 stores the battery characteristic information of battery 41 in advance in its own ROM and the like, in order to determine the allowable value of the charging current according to the state of battery 41. The battery characteristic information according to the present embodiment is stored, for example, as the table data in which the allowable value of the charging current of battery 41 is associated with the two variables of the temperature and the charging rate of battery 41 at each time during execution of charging.

Battery ECU 42 refers to the battery characterization, and determines an allowable value of the charging current supplied to battery 41, from the current temperature and charging rate of battery 41 at the present time. Battery ECU 42 outputs information indicating the allowable value of the charging current at the present time to relay ECU 22.

The "allowable value of the charging current of battery 41" is a level of a current at an allowable limit that can be charged safely and without causing deterioration, based on the characteristics of battery 41 (e.g., the mode of chemical reaction, the specific gravity of the electrolyte, the generated gas in the electrolyte, and/or the like), and is set in advance for each type of battery 41 or individually. The allowable value of the charging current generally varies depending on the temperature and the charging rate of battery 41 and the like.

FIG. 3 is a diagram illustrating an example of temperature-based battery characteristic information of battery 41.

The battery characteristic information illustrated in FIG. 3 shows an example of the relationship between the temperature [° C.] of battery 41 and the allowable value [A] of the charging current of battery 41 when the charging rate of battery 41 is the constant (for example, 20%). The horizontal axis of FIG. 3 represents the temperature of battery 41, and the vertical axis represents the allowable value of the charging current of battery 41.

The allowable value of the charging current of battery 41 is generally, as illustrated in FIG. 3, a significantly smaller when the temperature of battery 41 is a temperature of predetermined value or less (e.g., 0° C. or less), and increases as the temperature of battery 41 rises. The temperature of battery 41 is principally dependent on the external environment of vehicle A, but also varies due to the heat generated by battery 41 itself during execution of charging of battery 41.

Therefore, it is preferable that the allowable value of the charging current of battery 41 is determined depending on the temperature of battery 41 at each time during execution of charging.

The allowable value of the charging current of battery 41 generally decreases as the charging rate of battery 41 increases. Therefore, the allowable value of the charging current of battery 41 is more preferably determined depending on the charging rate of battery 41 at each time during execution of charging.

When battery ECU 42 temporally changes the allowable value of the charging current of battery 41 based on both the temperature and the charging rate of battery 41, for example, the charging current of battery 41 indicates a behavior such as a solid line graph at low temperature of FIG. 6 to be described later.

Note that, obviously, the allowable value of the charging current in the battery characteristic information need not necessarily be a value uniquely determined by the provider of battery 41, and may be appropriately changed from the viewpoint of stability of control and safety standards. The battery characteristic information defining the allowable value of the charging current and the like may be set only for the section where feedback-control of charging circuit 31 is performed based on at least the allowable value of the charging current (section of CC charging of FIG. 6 to be described later).

When battery 41 is in a low temperature state such as immediately after the start of charging, the allowable value of the charging current in the battery characteristic information principally depends on only the temperature of battery 41. Therefore, the allowable value of the charging current, immediately after such start of charging, may be determined solely by the temperature of battery 41, without relying on the rate of charging of battery 41.

<Relay ECU 22>

Relay ECU 22 is disposed in junction box 20 and is an ECU that relays the communication between battery ECU 42 and charger ECU 32 and the like.

Relay ECU 22 according to the present embodiment includes battery status acquirer 22a, heater controller 22b, output adjustor 22c, and current detector 22d.

Battery state acquirer 22a acquires information related to the state of battery 41 from battery ECU 42 through communication with battery ECU 42.

Battery status acquirer 22a according to the present embodiment acquires information related to the allowable value of the charging current of battery 41, the charging rate of battery 41, and the temperature of battery 41 from battery ECU 42 at a predetermined frequency (e.g., one or more times in one second) in order to optimize the output current of charging circuit 31 during execution of charging.

Heater controller 22b controls the operating state of PTC heater 43 based on the information related to the temperature of battery 41 acquired by battery state acquirer 22a.

When charging of battery 41 is executed, heater controller 22b according to the present embodiment supplies the output power of charging circuit 31 to PTC heater 43 by turning on switch 43a in the case that the temperature of battery 41 is equal to or lower than the threshold temperature that causes a charging failure of battery 41 (hereinafter, also referred to as "low temperature side threshold temperature", for example, 0° C.), which is set in advance. Meanwhile, heater controller 22b stops the operation of PTC heater 43 by turning off switch 43a in the case that the temperature of battery 41 exceeds the threshold temperature that allows good charging of battery 41 (hereinafter, also referred to as "high-temperature side threshold temperature", for example, 30° C.), which is set in advance.

Output adjustor 22c calculates the total value of the allowable value of the charging current of battery 41 at each time during execution of charging and the current consumption of PTC heater 43 at each time during execution of charging. Output adjustor 22c determines the target value of the output current of charging circuit 31 corresponding to the total value and the increase or decrease of the total value. Output adjustor 22c commands the target value of the output current of charging circuit 31 to the charger ECU 32.

When charging circuit 31 also supplies power to load device R, output adjustor 22c, further, corrects the target value of the output current of charging circuit 31 based on the current consumption of load device R that current detector 22d detects (detailed later).

Thus, the output current of charging circuit 31 will be controlled so that the actual value of the charging current of battery 41 is within a range of the allowable value and is close to the allowable value of the charging current of battery 41, at that time during execution of charging.

The target value of the output current of charging circuit 31 is typically a value that matches the total value of the allowable value of the charging current of battery 41 and the current consumption of PTC heater 43 at each time during execution of charging. However, the target value including the margin during the load change, for example, may be larger than the allowable value of the charging current of battery 41 at each time during execution of charging, and may be equal to or less the total value of the allowable value of the charging current of battery 41 and the current consumption of PTC heater 43 at each time during execution of charging.

For example, output adjustor 22c identifies the allowable value of the charging current of battery 41 determined by battery ECU 42, based on the allowable value information of the charging current acquired by the battery state acquirer 22a. For example, output adjustor 22c determines the current consumption of PTC heater 43 at each time during execution of charging based on the heater characteristic information of PTC heater 43, the voltage applied to PTC heater 43, and the temperature of PTC heater 43.

Relay ECU 22 stores the heater characteristic information of PTC heater 43 in advance in its own ROM and the like, in order to calculate the current consumption corresponding to the voltage applied to PTC heater 43 and the temperature of PTC heater 43. The heater characteristic information according to the present embodiment is stored as, for example, table data associated the current consumption of PTC heater 43 with the two variables of the temperature of PTC heater 43 and the voltage applied to PTC heater 43 at each time during execution of charging.

FIG. 4 is a diagram illustrating an example of the heater characteristic information of PTC heater 43. The horizontal axis of FIG. 4 represents the temperature [° C.] of PTC heater 43, and the vertical axis represents the current consumption [A] of PTC heater 43 at the temperature.

PTC heater 43, generally, as illustrated in the dotted line of FIG. 4 (heater resistance curve), has a characteristic that the electrical resistance is large at low temperatures and increases as the temperature rises. Therefore, the current consumption of PTC heater 43 varies depending on the temperature of PTC heater 43 at each time during execution of charging.

The heater characteristic information of PTC heater 43 in FIG. 4 represents the current consumption of PTC heater 43 in the case assuming that the voltage applied to PTC heater 43 is constant. However, the voltage applied to PTC heater 43 becomes a voltage corresponding to the voltage between the terminals of battery 41.

The heater characteristic information is set so as to allow estimation of the current consumption of PTC heater 43 from the temperature of PTC heater 43 and the voltage applied to PTC heater 43, in consideration of the characteristics of PTC heater 43. More specifically, output adjustor 22c is configured to estimate the temperature of PTC heater 43 and the voltage applied to PTC heater 43 from the temperature information of battery 41 and the voltage between the terminals acquired by battery state acquirer 22a, and to estimate the current consumption of PTC heater 43 at each time during execution of charging.

Thus, in-vehicle charging system U according to the present embodiment controls the output current of charging circuit 31 so that the actual value of the charging current supplied to battery 41 approaches to the allowable value of the charging current, from the viewpoint of shortening the charging time and preventing of overcurrent in battery 41. In-vehicle charging system U control the output current of charging circuit 31 so that the actual value of the charging current approaches to the allowable value within the allowable value of the charging current corresponding to the charging rate, in accordance with the change in the state of battery 41 and the state of PTC heater 43 at each time during execution of charging.

However, the output power of charging circuit 31 has the output limit (hereinafter, referred to as "outputtable power" or "outputtable current"). Therefore, output adjustor 22c determines the target value of the output current of charging circuit 31 in a range that the total of the power supplied to battery 41 and PTC heater 43 from charging circuit 31 does not exceed the outputtable power of charging circuit 31.

In in-vehicle charging system U according to the present embodiment, the frequency at which battery ECU 42 detects the state of battery 41, the frequency at which relay ECU 22 detects the state of PTC heater 43, and the frequency at which relay ECU 22 determines the target value of the output current of charging circuit 31 and/or the like may be a frequency that cause no problem from the viewpoint of shortening the charging time and preventing overcurrent in battery 41, and be at least a plurality of times (i.e., two or more times) during execution of charging.

However, as illustrated in FIG. 2, the output of charging circuit 31 may be also supplied as power to load device R connected in parallel with battery 41, via power conversion device 50.

Current detector 22d operates in such a case, detects the current consumption of load device R, and corrects the target value of the output current of charging circuit 31 set by output adjustor 22c.

The power consumption of load device R (e.g., a headlight or an acoustic device of vehicle A) is smaller than the power consumption of PTC heater 43. Therefore, the degree that the power consumption of load device R induces against the charging current of battery 41 due to the load change of load device R is also small. However, such a load device R operates by the operation of the driver and/or the like. Therefore, it is difficult to predict the power consumption (current consumption) of load device R.

In in-vehicle charging system U according to the present embodiment, current sensor 23 (e.g., a shunt resistor or Hall element) is provided in order to detect the current consumption of load device R, from such a viewpoint. Current sensor 23 is disposed on, for example, battery 41 side than a position branching into battery 41 and load device R., in the current path between charging circuit 31 and battery 41.

Current detector 22d according to the present embodiment sequentially obtains sensor values from current sensor 23. Thus, current detector 22d detects the actual value of the total amount of the charging current supplied to battery 41 and the current consumption supplied to PTC heater 43. In other words, current detector 22d detects the current consumption of load device R as the deviation amount of the actual value from the predicted value of the total amount of the charging current supplied to battery 41 and the current consumption supplied to PTC heater 43 at the time of determining the target value of the output current of charging circuit 31.

Output adjustor 22c according to the present embodiment increases the target value of the output current of charging circuit 31 so as to replenish the current consumption (I3) of load device R detected in the manner described above. Output adjustor 22c determines the target value of the output current of charging circuit 31 so as to approach (e.g., to match) to the total of the allowable value of the charging current of battery 41, the current consumption of PTC heater 43, and the current consumption of load device R (i.e., Iout=I1+I2+I3).

The configuration of relay ECU 22 can be variously changed as follows.

As a method in which relay ECU 22 (output adjustor 22c) determines the current consumption of PTC heater 43, for example, separately, a sensor detecting the temperature information of PTC heater 43 and the voltage applied to PTC heater 43 directly may be used. Without using a sensor in particular, a method of estimating the current consumption of PTC heater 43 and/or the like may be used, based on the elapsed time or the like from the start of operation of PTC heater 43.

On the other hand, in the case that a resistance type heater whose electric resistance does not change depending on the temperature is used in place of PTC heater 43, as the battery temperature adjustment device, relay ECU 22 (output adjustor 22c) may be configured to detect the current consumption of the resistance type heater from only the voltage between the terminals of battery 41 and the electric resistance of the resistance type heater.

As a method in which relay ECU 22 (output adjustor 22c) identifies the allowable value of the charging current of battery 41, a method may be used in which the battery characteristic information is stored in the ROM and/or the like of relay ECU 22 itself, and the allowable value of the charging current is calculated based on the information related to the state of battery 41 acquired from battery ECU 42.

The target value of the output current of charging circuit 31 that relay ECU 22 (output adjustor 22c) commands charger ECU 32 may be a target value itself of the output current of charging circuit 31, or may be a command for increasing or decreasing from a predetermined reference value.

Relay ECU 22 (output adjustor 22c) may control charging in the constant current mode of the current base described above only at the time of start of charging, and may control charging in the constant voltage mode by determining only the target value of the output voltage of charging circuit 31 at the end of the charging period.

[Operation of In-Vehicle Charging System]

Next, with reference to FIGS. 5 to 7, an example of the operation at the time of charging of in-vehicle charging system U according to the present embodiment will be described.

Figure 5:
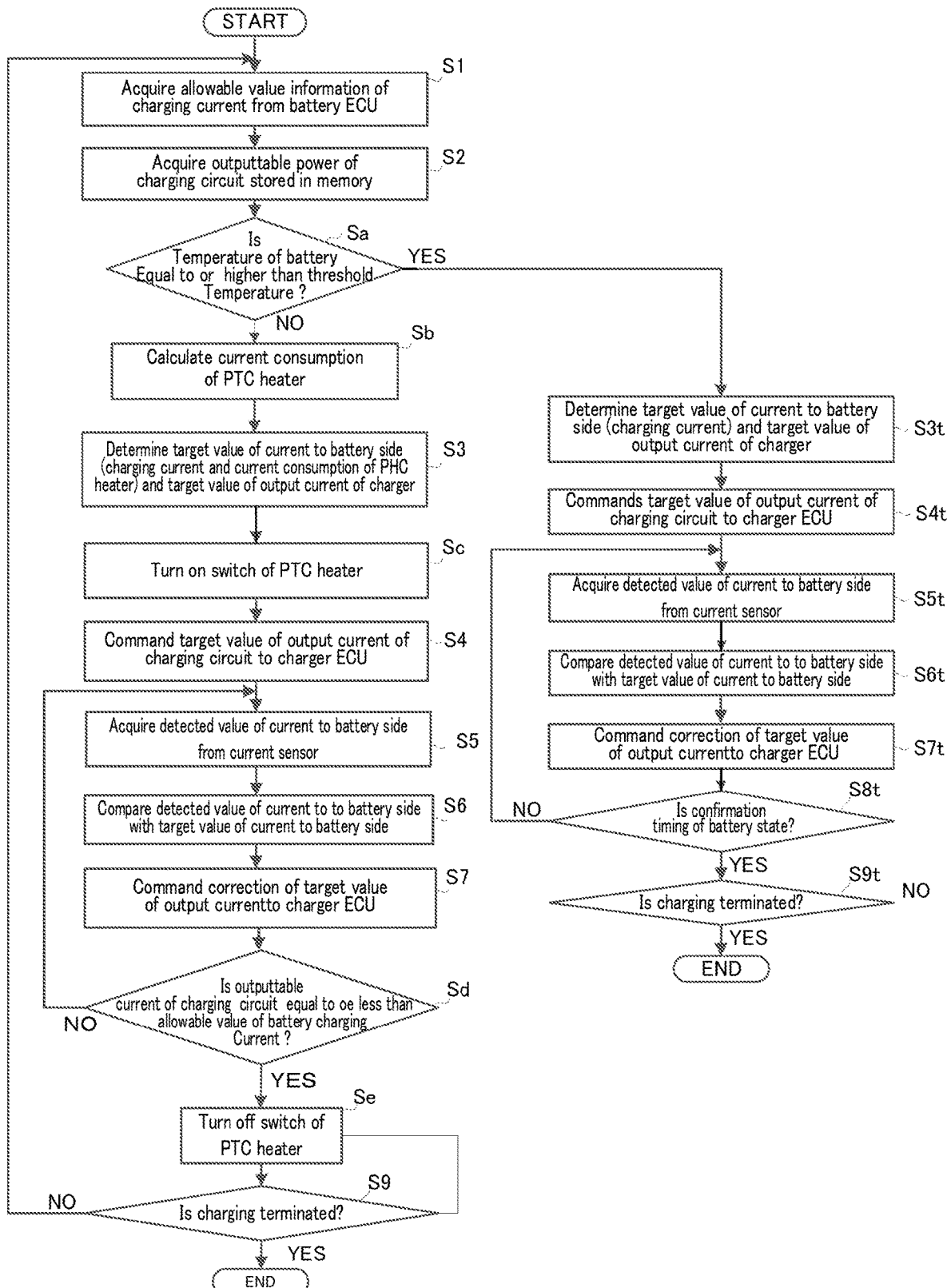
FIG. 5 is a flowchart showing an example of the operation of a relay ECU according to Embodiment 1.

FIG. 5 is a flowchart showing an example of operation of relay ECU 22 according to the present embodiment.

The flowchart of FIG. 5 represents processes executed by relay ECU 22 in order according to the computer programs. This flowchart is executed, for example, when a charge start command of battery 41 is input to relay ECU 22 from vehicle ECU 10.

Figure 6:
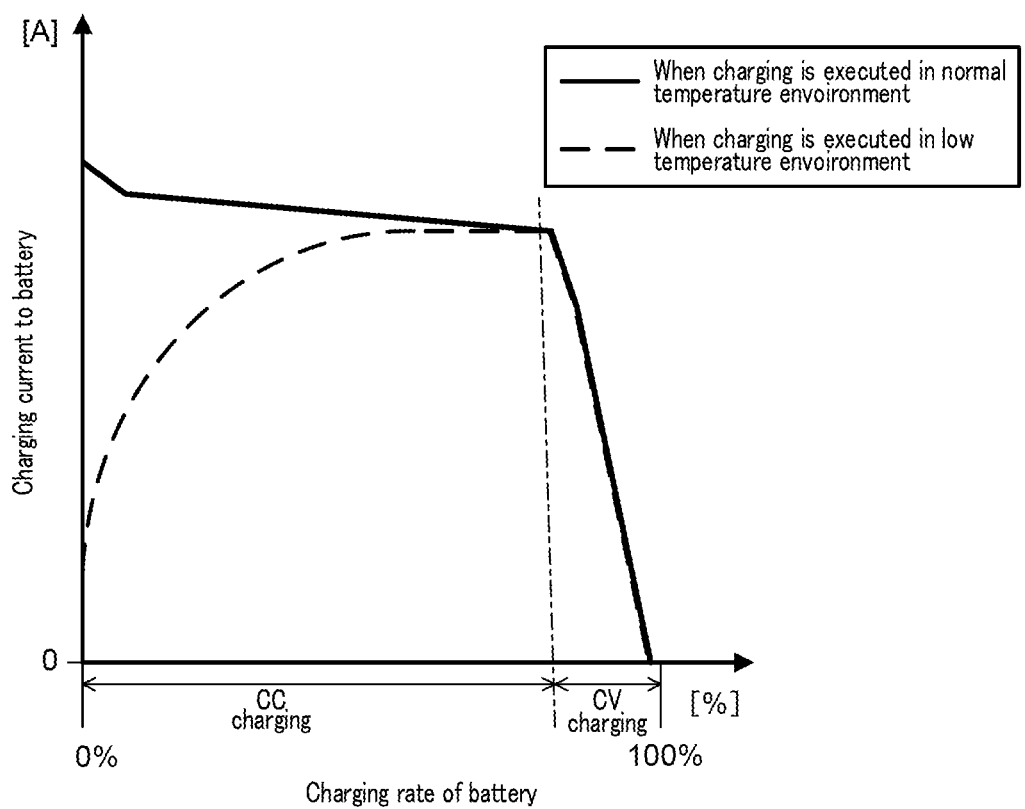
FIG. 6 is a diagram illustrating an example of the behavior of the charging current during battery charging in the in-vehicle charging system according to Embodiment 1.

FIG. 6 is a diagram illustrating an example of the behavior of the charging current at charging of battery 41 in in-vehicle charging system U according to the present embodiment. In FIG. 6, the vertical axis represents the charging current [A] to battery 41 and the horizontal axis represents the charging rate [%] of battery 41.

The dotted line graph of FIG. 6 illustrates an example of a temporal change in charging current to battery 41 when charging of battery 41 in a normal temperature environment (e.g., 10° C.) is executed. The solid line graph of FIG. 6 also illustrates an example of a temporal change in charging current to battery 41 when charging of battery 41 in a cold environment (e.g., −10° C.) is executed.

In-vehicle charging system U according to the present embodiment employs a constant current constant voltage (CCCV) charging method. Until the charging rate of battery 41 becomes less than the threshold value (the area of the CC charging in FIG. 6) output adjustment of charging circuit 31 is executed based on the allowable value of the charging current in battery 41. In the case that the charging rate of battery 41 becomes equal to or larger than the threshold value (the area of the CV charging in FIG. 6), output adjustment of charging circuit 31 is executed based on the allowable value of the charging voltage in battery 41 (i.e., the voltage between the terminals of battery 41) (not shown in FIG. 6).

More particularly, in in-vehicle charging system U according to the present embodiment, charging is executed so that the actual value of the charging current of battery 41 becomes substantially the same current level as the allowable value of the charging current in battery 41, by executing the processes of FIG. 5, in the region of the CC charging of FIG. 6. Meanwhile, the region of CV charging of FIG. 6 is a region where charging is executed in a constant voltage state at a predetermined voltage level. In the flowchart of FIG. 5, the description about the control of the CV charging is omitted.

Returning to the operation flow of FIG. 5, a series of processes at the time of charging will be described. In the operation flow of FIG. 5, steps S3$t$ to S9$t$ on the right side (in the case of Sa: YES) illustrate the processing flow when PTC heater 43 is not in operation, and steps S3 to S9 on the left side (in the case of Sa: NO) illustrate the processing flow when PTC heater 43 is in operation, starting from step Sa.

In step S1, relay ECU 22 first acquires the allowable value information of the charging current in battery 41 from battery ECU 42 by communication with battery ECU 42, and sets the allowable value information in its own RAM and/or the like.

In this step S1, for example, battery ECU 42 determines the allowable value of the charging current in battery 41 from the current charging rate and the temperature of battery 41 by referring to the battery characteristic information of battery 41 in response to a request signal from relay ECU 22, and transmits the allowable value to relay ECU 22.

In S2, relay ECU 22 acquires the outputtable power of charging circuit 31 stored in advance in its own ROM and/or the like.

In step Sa, relay ECU 22 acquires the temperature information of battery 41 from battery ECU 42 and determines whether or not the temperature of battery 41 is equal to or higher than the low temperature side threshold temperature (the reference temperature for determining whether or not to use PTC heater 43, for example, 0° C.). In the case that the temperature of battery 41 is equal to or higher than the low temperature side threshold temperature (Sa: YES), relay ECU 22 executes charging of battery 41 without using the PTC heater 43. Meanwhile, in the case that the temperature of battery 41 is less than the low temperature side threshold temperature (Sa: NO), relay ECU 22 executes charging of battery 41, while raising the temperature by PTC heater 43.

First, steps S3$t$ to S9$t$ on the right side (in the case of Sa: YES), which is a processing flow when PTC heater 43 is not in operation, will be described.

In step S3$t$, relay ECU 22 determines the target value of the current to be supplied to battery 41 (in this case, the charging current of battery 41) and the target value of the output current of charging circuit 31 within the range of the outputtable current of charging circuit 31, based on the allowable value of the charging current acquired in step S1 and the current consumption requested by load device R at the present time. At this time, relay ECU 22, for example, determines the allowable value of the charging current of battery 41 as a target value of the current to be supplied to battery 41 side (in this case, the charging current of battery 41). When the current consumption of load device R is zero, relay ECU 22 determines the target value of the current to be supplied to battery 41 side as the target value of the output current of charging circuit 31 (Iout=I1). When the current consumption of load device R is not zero, relay ECU 22 determines the current level obtained by adding the current consumption required by load device R with respect to the target value of the current to be supplied to battery 41 side at the present time, as the target value of the output current of charging circuit 31 (Iout=I1+I3).

In addition, in step S3$t$, when the total of the power consumption supplied to load device R and the charging power supplied to battery 41 exceeds the outputtable power of charging circuit 31, relay ECU 22 sets the outputable current of charging circuit 31 as a target value of the output current of charging circuit 31.

Note that, in step S3$t$, relay ECU 22 detects the current consumption of loading device R by storing the current corrected in steps S5 to S7, which will be described later, in its own RAM and/or the like.

In step S4$t$, relay ECU 22 commands a target value of the output current of charging circuit 31 to charger ECU 32.

Note that, in step S4$t$, charger ECU 32 controls the operation of charging circuit 31 so that the output current of charging circuit 31 becomes the target value commanded by relay ECU 22 in response to the command signal from relay ECU 22.

In step S5$t$, relay ECU 22 acquires a signal indicating the detected value of the current to be supplied to battery 41 side (in this case, the charging current of battery 41), which is input from current sensor 23, and stores the signal in its own RAM and/or the like.

In step S6$t$, relay ECU 22 compares the detected value of the current to be supplied to battery 41 side with the target value of the current supplied to battery 41 side, calculated in step S3$t$. In step S6$t$, relay ECU 22, for example, determines whether or not the target value of the current supplied to battery 41 side is larger than the detected value of the current to be supplied to battery 41 side by a threshold value (for example, 1 ampere) or more, or whether or not the detected value of the current supplied to battery 41 side is larger than the target value of the current supplied to battery 41 side by a threshold value or more.

In step S7$t$, relay ECU 22 transmits the correction command to charger ECU 32 based on the comparison result of step S6$t$. Thus, the target value of the output current of charging circuit 31 is corrected so as to approach the total value of the charging current supplied to battery 41 and the load current of the other load device R (Iout=I1+I3).

In step S7t, for example, when the target value of the current supplied to battery 41 side is larger than the detected value of the current to be supplied to battery 41 side by the threshold value or more, relay ECU 22 increments the target value of the output current of charging circuit 31 by one level (for example, 1 ampere), and transmits the correction command related to the output current of charging circuit 31 to charger ECU 32. When the detected value of the current to be supplied to battery 41 side is larger than or equal to the threshold value than the target value of the current supplied to battery 41 side, the target value of the output current of charging circuit 31 is decremented by one level, charger ECU 32 to transmit a correction command according to the output current of charging circuit 31.

In step S8t, relay ECU 22 determines whether or not it is a state confirmation timing of battery 41. When it is not the state confirmation timing of battery 41 (step S8t:NO), relay ECU 22 returns to step S5t. Relay ECU 22 adjusts the target value of the output current of charging circuit 31 such that the target value matches the detected value of the current to be supplied to battery 41 side, by repeatedly executing the processes of the steps S5t to S7t.

On the other hand, when it is the state confirmation timing of battery 41 (step S8t:YES), relay ECU 22 advances the process to step S9t and transmits the request signal related to the state of battery 41 to battery ECU 42.

In step S9t, relay ECU 22 communicates with battery ECU 42 to determine whether or not to terminate the charging of battery 41. When the charging of battery 41 is terminated (step S9t: YES), relay ECU 22 terminates the series of processes. Meanwhile, when the charging of battery 41 is not terminated (step S9t:NO), relay ECU 22 returns to step S1, acquires the allowable value information of the charging current from battery ECU 42 again, and continues the process of adjusting the actual value of the charging current to battery 41 such that the actual value approaches the allowable value of the charging current of battery 41 at the respective points at each time during execution of charging.

Next, steps S3 to S9 on the left side (in the case of Sa: NO), which is a processing flowchart when PTC heater 43 is operated, will be described.

In step Sb, relay ECU 22 estimates the temperature of PTC heater 43 and the voltage applied to PTC heater 43 from the temperature of battery 41 and the voltage between the terminals of battery 41 at the present time, acquired in the step Sb2, and calculates the current consumption of PTC heater 43 at the present time based on the heater characteristic information stored in its own ROM and/or the like.

In step S3, relay ECU 22 determines the target value of the current to be supplied to battery 41 (in this case, the total value of the charge current of battery 41 and the consumption current of PTC heater 43) and the target value of the output current of charging circuit 31, within the range of the outputtable current of charging circuit 31, based on the allowable value of the charging current obtained in step S1 and the current consumption of PTC heater 43 calculated in step Sb.

At this time, for example, relay ECU 22 determines the total value of the allowable value of the charging current of battery 41 and the current consumption of PTC heater 43 as a target value of the current to be supplied to battery 41 side (in this case, the total of the charging current of battery 41 and the current consumption of PTC heater 43). At this time, when the current consumption of load device R is zero, relay ECU 22 determines the target value of the current to be supplied to battery 41 side as the target value of the output current of charging circuit 31 (Iout=I1+I2). When the current consumption of load device R is not zero, relay ECU 22 determines the current level obtained by adding the current consumption required by load device R at the present time, with respect to the target value of the current supplied to battery 41 side, as the target value of the output current of charging circuit 31 (Iout=I1+I2+I3).

In step Sc, relay ECU 22 turns on switch 43a of PTC heater 43, and supplies power to PTC heater 43 from charging circuit 31. Thus, the heating of battery 41 by PTC heater 43 is started. The heating of battery 41 by PTC heater 43 is continued until it is determined that the heating of battery 41 is completed in step Sd described later. Note that, when the heating operation by PTC heater 43 is already executed, relay ECU 22 continues the heating operation by PTC heater 43, without particularly executing the process.

The processes of steps S4 to S7 are the same as the processes of steps S4t to S7t described above.

In step S4, relay ECU 22 commands the target value of the output current of charging circuit 31 to charger ECU 32. In step S5, relay ECU 22 acquires a signal indicating the detected value of the current to be supplied to battery 41 side (in this case, the charging current I1 of battery 41+the current consumption I2 of PTC heater 43) which is input from current sensor 23, and stores the signal in its own RAM and/or the like. In step S6, relay ECU 22 compares the detected value of the current to be supplied to battery 41 side with the target value of the current to be supplied to battery 41 side, and determines whether or not the target value of the current to be supplied to battery 41 side is larger than the detected value of the current to be supplied to battery 41 side by a threshold value (for example, 1 ampere) or more, or whether or not the detected value of the current to be supplied to battery 41 side is larger than the target value of the current to be supplied to battery 41 side by a threshold value or more. In step S7, relay ECU 22 increments or decrements the target value of the output current of charging circuit 31, based on the comparison result of step S6, and sends a correction command related to the output current of charging circuit 31 to charger ECU 32.

Thus, the target value of the output current of charging circuit 31 is corrected so as to approach the allowable value of the charging current of battery 41, the current consumption of PTC heater 43, and the total value of the load current of the other load device R (Iout=I1+I2+I3).

In step Sd, relay ECU 22 determines whether or not the allowable value of the charging current of battery 41 at the present time has reached or exceeded the outputtable current of charging circuit 31, with the temperature rise of battery 41. When the allowable value of the charging current of battery 41 at the present time reaches or exceeds the outputtable current of charging circuit 31 (step Sd: YES), relay ECU 22 advances the process to step Se. When the allowable value is less than the output possible current of charging circuit 31 (step Sd: NO), relay ECU 22 returns to step S5 and repeatedly executes the processes of steps S5 to S7.

This step Sd is a processing for determining an operation stop timing of PTC heater 43. The operation stop timing of PTC heater 43 needs to be the timing satisfying both the first condition that the temperature of battery 41 has reached to the high temperature side threshold temperature (e.g., 30° C.), and the second condition that the actual value of the charging current of battery 41 does not exceed the allowable value of the charging current of battery 41 even when the operation of PTC heater 43 is stopped and an excess current accompanying the stop of the operation of PTC heater 43 flows into battery 41.

It is possible to substantially determine whether both of the first condition and the second condition are satisfied by determining whether or not the allowable value of the charging current of battery 41 at the present time has reached the outputtable current of charging circuit 31 as step Sd. However, obviously, relay ECU 22 may execute the first condition and the second condition separately when determining the operation stop timing of the PTC heaters 43.

Meanwhile, in step Sd, when it is less than the outputtable current of charging circuit 31 (step Sd: NO), relay ECU 22 may return to step S1. Thus, it is possible to determine the target value of the output current corresponding to the state of battery 41 and the state of PTC heater 43, more frequently.

In step Se, relay ECU 22 turns off switch 43a of the PTC heater 43. Thus, the heating of battery 41 by PTC heater 43 is terminated.

In step S9, relay ECU 22 determines whether or not charging is terminated by communication with battery ECU 42. When the charging end (S9: YES), relay ECU 22 outputs a charging termination command to charger ECU 32, and terminates the series of processes. On the other hand, when the charging is not terminated (S9: NO), relay ECU 22 returns to step S1, and continues the process again. The subsequent flow of processes to be executed by relay ECU 22 are the processes corresponding to steps S3t to S9t on the right side (in the case of Sa: YES).

Relay ECU 22 adjusts the output current of charging circuit 31 such that the actual value of the charging current to be supplied to battery 41 matches the allowable value of the charging current, by repeatedly executing the processes of steps S1 to S9.

Figure 7A:
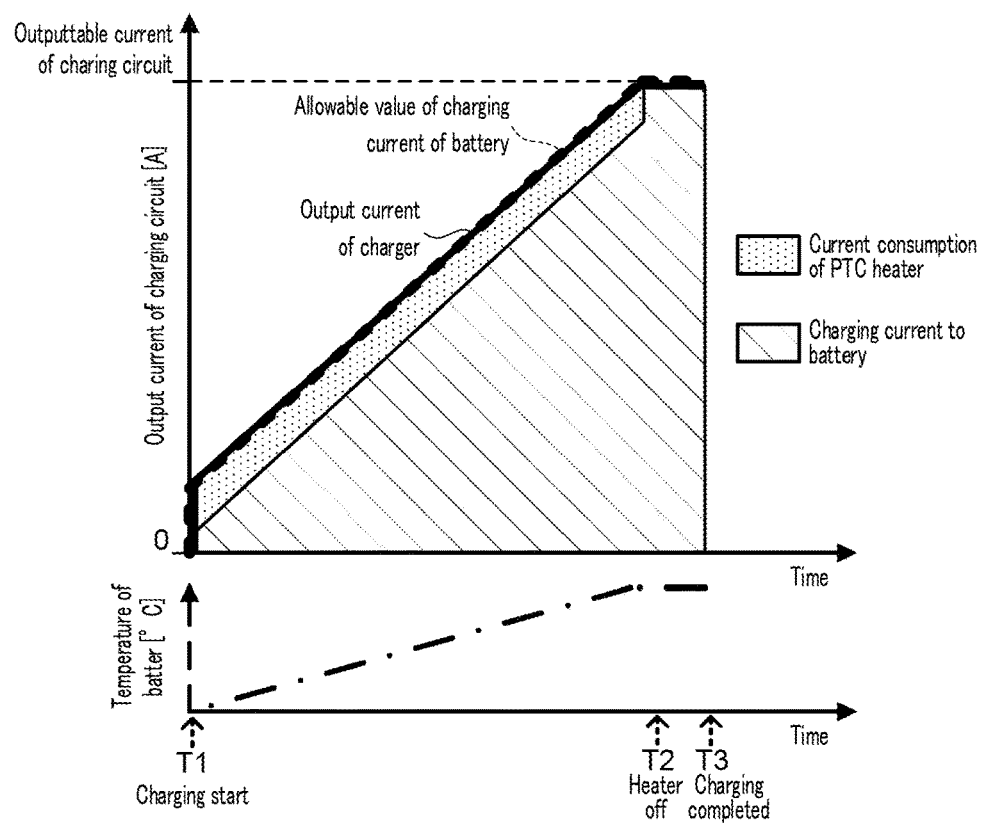
FIG. 7A is a diagram schematically illustrating a method of setting a target value of an output current of a charging circuit in an in-vehicle charging system according to the related art.
Figure 7B:
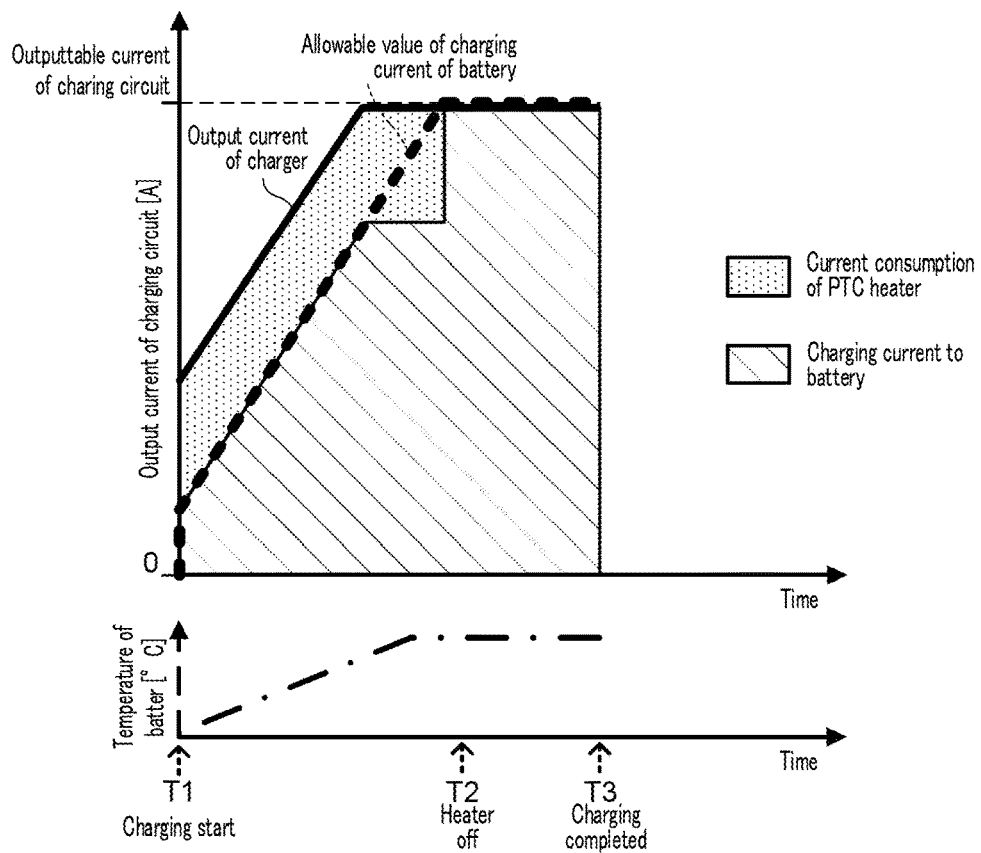
FIG. 7B is a diagram schematically illustrating a method of setting a target value of an output current of a charging circuit in an in-vehicle charging system according to Embodiment 1.

Referring to FIGS. 7A and 7B, the setting method of the target value of the output current of charging circuit 31 in the vehicle-mounted charging system U according to the present embodiment will be described with a comparison with the setting method of the target value of the output current of charging circuit 31 in the vehicle-mounted charging system according to the related art.

FIG. 7A is a diagram schematically illustrating the setting method of the target value of the output current of charging circuit 31 in the vehicle-mounted charging system according to the related art. FIG. 7B is a diagram schematically illustrating the setting method of the target values of the output currents of the charging circuits 31 in in-vehicle charging system U according to the present embodiment.

FIGS. 7A and 7B illustrates the target value of the output current of charging circuit 31 at each time during execution of charging from the start of charging to the completion of charging (solid line graph), and the temporal change of the allowable value of the charging current of battery 41 (dotted line graph). FIGS. 7A and 7B represent the respective graphs on the same scale so that the graphs are comparable to each other.

The horizontal axes of FIGS. 7A and 7B each represent the time axis from the start of charging to the completion of charging, and the vertical axes thereof each represent the target value of the output current of charging circuit 31. T1, T2, and T3 of each of the horizontal axes of FIGS. 7A and 7B, respectively, represent a charging start timing, the operation stop timing of PTC heater 43, and a charging termination timing.

In the solid line graph of FIGS. 7A and 7B, the ratio occupied respectively by the charge current of battery 41 and the current consumption PTC heater 43 (the shaded area corresponds to the charge current of battery 41, and the dot area corresponds to the current consumption of PTC heater 43), in the output current of charging circuit 31 at each time during execution of charging.

The dotted line graph of FIGS. 7A and 7B represents the allowable charge current of battery 41 at each time during execution of charging is executed on the same time scale and the same current scale as the solid line graph.

The dashed line graph of FIGS. 7A and 7B represents the temporal change in the temperature of battery 41 during the period from the start of charging to the completion of charging at the same time scale as the solid line graph.

In the in-vehicle charging system according to the related art, as illustrated in FIG. 7A, the target value of the output current of charging circuit 31 (the solid line graph) is determined so as to be the same value as the allowable value of the charging current of battery 41 (the dotted line graph).

A reason for adopting such a configuration in the in-vehicle charging system according to the related art is to prevent the overcurrent state in battery 41 from being generated, when the current consumption of PTC heater 43 is reduced, due to the phenomenon that excess of the current consumption of PTC heater 43 flows into battery 41 side, and then the actual value of the charging current of battery 41 exceeds the allowable value of the charging current of battery 41. In other words, in the in-vehicle charging system according to the related art, when PTC heater 43 is in operation, for this reason, although the allowable value of the charging current of battery 41 at each time during execution of charging is recognized, it is a state of being forced to execute charging at the current level considerably smaller than the allowable value of the charging current.

In in-vehicle charging system U according to the present embodiment, as illustrated in FIG. 7B, the target value of the output current of charging circuit 31 (solid line graph) is determined by recognizing each of the allowable value of the charging current of battery 41 at each time during execution of charging, the current consumption of PTC heater 43 and the current consumption of load device R.

Therefore, in in-vehicle charging system U according to the present embodiment, the target value of the output current of charging circuit 31 (solid line graph) is determined so as to be a value resulting from addition of the current consumption of PTC heater 43 and the current consumption of load device R to the allowable value of the charging current of battery 41 (dotted line graph).

In in-vehicle charging system U according to the present embodiment, when the operation of PTC heater 43 is stopped, as described in the flowchart of FIG. 5, even when the excess of the current consumption of PTC heater 43 flows into battery 41 side, PTC heater 43 operation is stopped after whether or not the actual value of the charging current of battery 41 exceeds the allowable value of the charging current of battery 41 is determined.

In in-vehicle charging system U according to the present embodiment, thereby, even when PTC heater 43 is in operation, it is possible to execute charging with the charging current of the allowable limit of battery 41, without generating the overcurrent state with respect to battery 41.

[Effect]

As described above, according to in-vehicle charging system U according to the present embodiment, when the heating by PTC heater 43 (i.e., the battery temperature adjustment device) and the charging of battery 41 are simultaneously executed, the allowable value of the charging current of battery 41 and the current consumption of PTC heater 43 at each time during execution of charging are identified based on the battery characteristic information of battery 41 and the heater characteristic information of PTC heater 43, and the output current of charging circuit 41 is controlled so as to correspond to the total value of these values. In other words, the control device (charger ECU 32) of in-vehicle charging device 30 according to the present embodiment controls the output current of charging circuit 31 such that the output current approaches the total value of the allowable value of battery 41 and the current consumption of PTC heater 43 at each time during execution of charging, which are identified based on the battery characteristic information of battery 41 and the heater characteristic information of PTC heater 43 which are stored in advance.

Therefore, in-vehicle charging system U according to the present embodiment is capable of controlling the output current of charging circuit 41 such that the actual value of the charging current of battery 41 approaches the allowable value of the charging current of battery 41 within a range not exceeding the allowable value of the charging current thereof even when the temperature of battery 41 is controlled by PTC heater 43.

Thus, it is possible to suppress the generation of the overcurrent state in battery 41 while executing charging of battery 41 at high power, even when the operating state of PTC heater 43 is changed (typically, when the current consumption of PTC heater 43 is reduced). In other words, thus, it is possible to shorten the charging time of battery 41.

In particular, in-vehicle charging system U according to the present embodiment detects the state of battery 41 (the temperature of battery 41 and the charging rate of the battery) and determines the allowable value of the charging current of battery 41 based on the state of battery 41 at each time during execution of charging. Thus, the allowable value of the charge current of battery 41 can be determined so as to correspond to the state of battery 41 at each time during execution of charging (the temperature of battery 41 and the charging rate of the battery).

In particular, in-vehicle charging system U according to the present embodiment detects the temperature and the applied voltage of PTC heater 43, and determines the current consumption of PTC heater 43 at each time during execution of charging. Thus, the current consumption of PTC heater 43 can be calculated so as to correspond to the temperature change and/or the like of PTC heater 43.

In particular, in-vehicle charging system U according to the present embodiment, when the temperature adjustment of battery 41 by PTC heater 43 is terminated, the operation of PTC heater 43 is stopped after the allowable value of the charging current of battery 41 reaches or exceeds the outputtable current of charging circuit 31. Thus, it is possible to prevent the actual value of the charging current of battery 41 from exceeding the allowable value of the charging current of battery 41, even when the excess of the current consumption of PTC heater 43 flows into battery 41 side with the stop of the operation of PTC heater 43.

In particular, according to in-vehicle charging system U according to the present embodiment, it is possible to detect the current consumption of load device R at each time during execution of charging based on the sensor value of current sensor 23, and adjust the output current of charging circuit 31 so as to make a correction depending on the current consumption of load device R. Thus, charging to battery 41 can be executed at the current level of the allowable limit, while the overcurrent state to battery 41 is suppressed, even when power is supplied to battery 41, PTC heater 43, and load device R simultaneously from charging circuit 31.

[Other Embodiments]

The present invention is not limited to the above embodiment, and various modifications are conceivable.

In the above embodiment, as an example of in-vehicle charging system U, the mode using the constant current constant voltage (CCCV) charging system when charging circuit 31 is controlled is indicated. However, obviously, a control method of charging circuit 31 may be the mode in which feedback control of charging circuit 31 is performed based on the allowable value of the charging current as a reference over the entire period during execution of charging.

In the above-described embodiment, as an example of in-vehicle charging system U, the mode in which the output current of charging circuit 31 is controlled by the cooperation of charger ECU 32, battery ECU 42, and relay ECU 22 is indicated. However, the respective functions of charger ECU 32, battery ECU 42, and relay ECU 22 may be realized by one computer (e.g., vehicle ECU 10), or may be realized by being distributed in a plurality of computers as in the above embodiment.

In the above embodiment, as examples of various sensors for in-vehicle charging system U to detect the state of battery 41 and/or the like, current sensor 23, current sensor 44, and temperature sensor 45 are indicated. However, the method in which in-vehicle charging system U detects the state of battery 41 and the like is freely selected, and the state of battery 41 and the like may be indirectly obtained by arithmetic processing using sensor values of other sensors and/or the like.

In the above embodiment, as an example of charging circuit 31, AC/DC converter 31a and DC/DC converter 31b are indicated. However, the configuration of charging circuit 31 can be variously changed depending on the configuration of the power system of external power source S or vehicle A. For example, as DC/DC converter 31b, for example, a linear DC/DC converter may be used instead of the switching-driven DC/DC converter. The configuration for adjusting the level of the output current of charging circuit 31 may be the configuration in which a constant current circuit for varying the current level is provided at the subsequent stage of DC/DC converter 31b.

In the above embodiment, as an example of the power system of vehicle A, the configuration having power conversion device 50 and junction box 20 is indicated. However, it is possible to employ a configuration in which power conversion device 50 and/or junction box 20 is not provided. In that case, relay ECU 22 may be configured integrally with vehicle ECU 10, for example.

In the above embodiment, as an example of external power source S connected to vehicle A, the commercial power source of the single-phase AC is indicated. However, obviously, in-vehicle charging system U according to the present invention can be applied to the mode in which charging of battery 41 is performed from any external power source S. For example, external power source S may be an external power source of three-phase AC, or an external power source for supplying DC power.

While specific examples of the present invention have been described in detail above, these examples are merely illustrative and do not limit the scope of the claims. The technology described in the claims includes various modifications and variations of the specific examples illustrated above.

The disclosure of Japanese Patent Application No. 2018-021282, filed on Feb. 8, 2018, including the specification, drawings and abstract, is incorporated herein by reference in its entirety.

INDUSTRIAL APPLICABILITY

According to the in-vehicle charging system according to the present disclosure, it is possible to execute charging of the battery at a high power without generating an overcurrent state to the battery, even when the temperature adjustment of the battery by the battery temperature adjustment device and charging of the battery are simultaneously executed.

REFERENCE SIGNS LIST

A Vehicle
S External power source
U In-vehicle charging system
R Load device
10 Vehicle ECU
20 Junction box
21 Electric path switching circuit
22 Relay ECU
22a Battery state acquirer
22b Heater controller
22c Output adjustor
22d Current detector
23 Current sensor
30 Charging device
31 Charging circuit
31a AC/DC converter
31b DC/DC converter
32 Charger ECU
40 Electric storage device
41 Battery
42 Battery ECU
43 PTC heater (battery temperature adjustment device)
43a Switch
44 Current sensor
45 Temperature sensor
50 Power conversion device
60 Inverter device

The invention claimed is:

1. An in-vehicle charging device for converting, in a charging circuit, electric power supplied from an external power source, and supplying the electric power to a battery and a battery temperature adjustment device in parallel, the in-vehicle charging device comprising:
a control device for controlling an output current of the charging circuit such that the output current approaches a total value of an allowable value of a charging current of the battery and a current consumption of the battery temperature adjustment device at each time point during execution of charging, when temperature adjustment of the battery by the battery temperature adjustment device and charging of the battery are simultaneously executed,
wherein the allowable value of the charging current of the battery and the current consumption of the battery temperature adjustment device are identified based on battery characteristic information of the battery and heater characteristic information of the battery temperature adjustment device, the battery characteristic information and the heater characteristic information being stored in advance, and
wherein the control device controls the output current of the charging circuit such that the output current is larger than the allowable value of the charging current of the battery at each time point during execution of charging and is equal to or less than the total value of the allowable value of the charging current of the battery and the current consumption of the battery temperature adjustment device at each time point during execution of charging.

2. The in-vehicle charging device according to claim 1, wherein the allowable value of the charging current of the battery is identified based on the state of the battery detected at each time point during execution of charging and the battery characteristic information.

3. The in-vehicle charging device according to claim 2, wherein the state of the battery includes a temperature of the battery.

4. The in-vehicle charging device according to claim 2, wherein the state of the battery includes a charge rate of the battery.

5. The in-vehicle charging device according to claim 1, wherein the current consumption of the battery temperature adjustment device is identified based on the temperature of the battery temperature adjustment device detected at each time point during execution of charging and the heater characteristic information.

6. The in-vehicle charging device according to claim 1, wherein the current consumption of the battery temperature adjustment device is identified based on the voltage applied to the battery temperature adjustment device detected at each time during execution of charging and the heater characteristic information.

7. The in-vehicle charging device according to claim 1, wherein
the battery temperature adjustment device is a PTC heater, and
the current consumption of the battery temperature adjustment device is stored in association with the temperature of the battery temperature adjustment device and a voltage applied to the battery temperature adjustment device in the heater characteristic information.

8. The in-vehicle charging device according to claim 1, wherein
the battery temperature adjustment device is a resistive heater, and
the current consumption of the battery temperature adjustment device is stored in association with a voltage applied to the battery temperature adjustment device in the heater characteristic information.

9. The in-vehicle charging device according to claim 1, wherein, when the temperature adjustment of the battery by the battery temperature adjustment device is terminated, an operation of the temperature adjustment by the battery temperature adjustment device is terminated at a timing when the output current of the charging circuit does not exceed the allowable value of the charging current of the battery even in a case where the supplying of the electric power to the battery temperature adjustment device is stopped.

10. The in-vehicle charging device according to claim 9, wherein the operation of the temperature adjustment by the battery temperature adjustment device is terminated when the allowable value of the charging current of the battery is equal to or larger than an outputtable current of the charging circuit.

11. The in-vehicle charging device according to claim 1, wherein when the charging circuit supplies power to another load device in parallel in addition to the battery and the battery temperature adjustment device, the control device controls the output current of the charging circuit such that the output current approaches the total value of the current consumption of the other load device detected at each time point during execution of charging, the allowable value of the charging current of the battery, and the current consumption of the battery temperature adjustment device.

12. A control method of an in-vehicle charging device for converting, in a charging circuit, electric power supplied from an external power source, and supplying electric power to a battery and a battery temperature adjustment device in parallel, the method comprising:

controlling an output current of the charging circuit such that the output current approaches a total value of an allowable value of a charging current of the battery and a current consumption of the battery temperature adjustment device at each time point during execution of charging, when temperature adjustment of the battery by the battery temperature adjustment device and charging of the battery are simultaneously performed, wherein the allowable value of the charging current of the battery and the current consumption of the battery temperature adjustment device are identified based on battery characteristic information of the battery and heater characteristic information of the battery temperature adjustment device, the battery characteristic information and the heater characteristic information being stored in advance, and wherein controlling the output current of the charging circuit includes controlling the output current of the charging circuit such that the output current is larger than the allowable value of the charging current of the battery at each time point during execution of charging and is equal to or less than the total value of the allowable value of the charging current of the battery and the current consumption of the battery temperature adjustment device at each time point during execution of charging.

* * * * *